April 16, 1957 — T. H. DAVIS — 2,788,918
CONDIMENT DISPENSER
Filed March 25, 1955
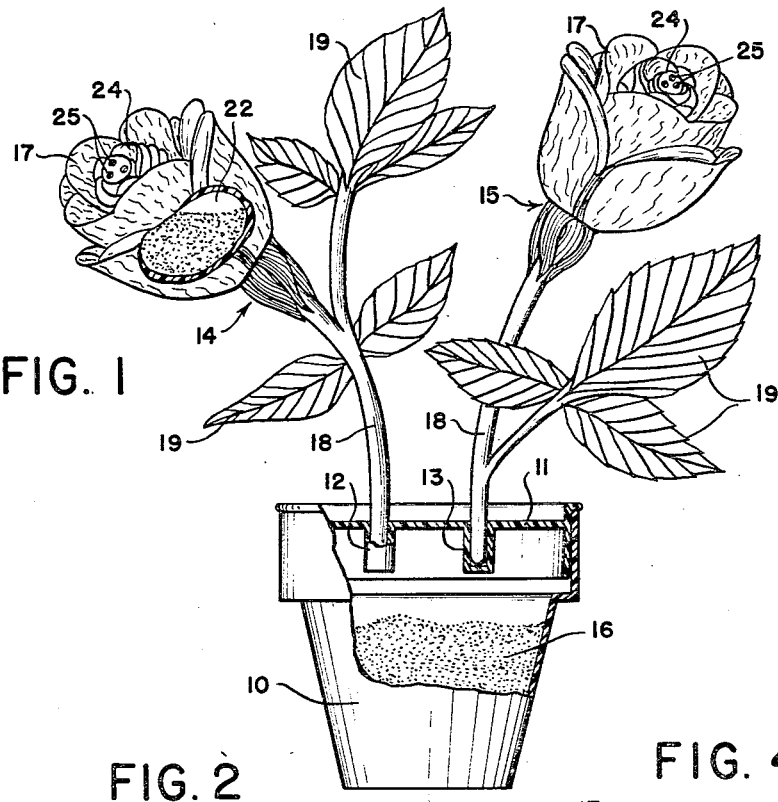
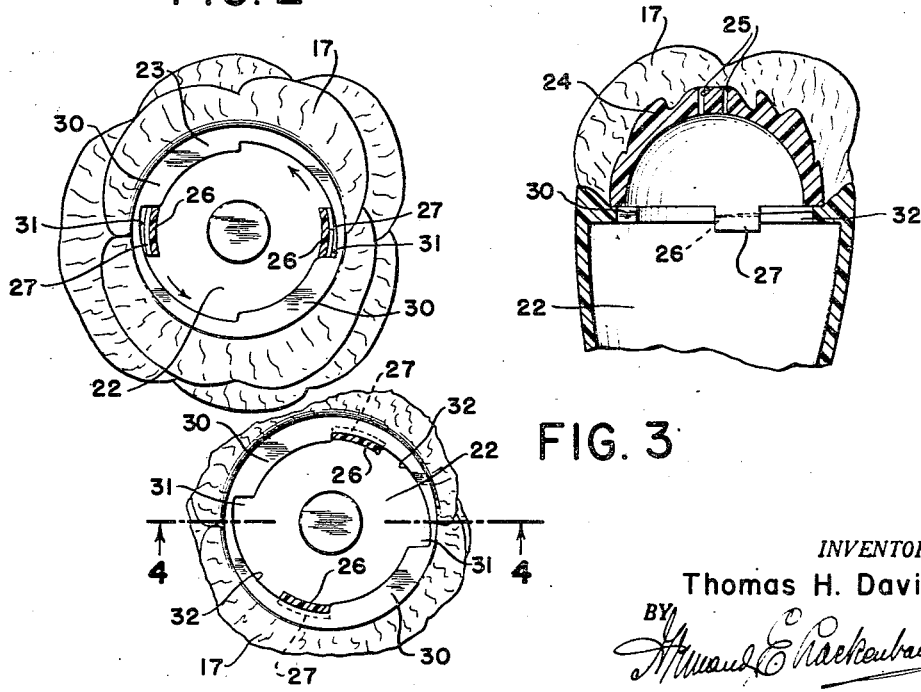
*INVENTOR.*
Thomas H. Davis
ATTORNEY

United States Patent Office 2,788,918
Patented Apr. 16, 1957

2,788,918
CONDIMENT DISPENSER

Thomas H. Davis, Brooklyn, N. Y., assignor to Buck Enterprises, Inc., Brooklyn, N. Y., a corporation of New York Application March 25, 1955, Serial No. 496,657

8 Claims. (Cl. 222—78)

This invention relates to a condiment container and more particularly to such a container which, due to its adaptability to decoration, is especially suitable for table use in the home or in a restaurant.

The condiment containers to which we are ordinarily accustomed are devised in more or less standard shapes, and these shapes have been the common ones long in use. For example, it seldom requires any extensive use of the imagination to detect a salt or pepper shaker. With such structures the emphasis has almost always been on the utilitarian, rather than the decorative. It is also common practice to require separate containers for salt, pepper, sugar and the like, all of which are generally present at the table during dining.

It is accordingly the primary object of this invention to provide a novel structure comprising a single unit, components of which may be removed from the single unit for use as an individual condiment dispenser. It is a further object herein to provide in such a unit decorative and attractive features, the features themselves being pleasing to the eye and in addition being adaptable to the application of various colors. Both these objects are achieved by providing a condiment dispenser in the form of a flower pot above which extend a plurality of flower shaped members. More precisely, the flower pot forms the base of the holder and has a cover in which are sockets, the foot of one of the flower shaped members fitting into each socket. The flower pot itself, then, can be used as a holder for a condiment whose presence in greater bulk is required, as for example, sugar, while each of the flower shaped members is so devised as to provide a compartment for either salt or pepper, each compartment being fitted with a removable aperture cover whereby the contents of the compartment may be dispensed.

Still another object herein is to provide, so far as the compartments and covers therefor in the flower shaped members are concerned, means whereby the cover may be easily removed, the compartment filled, and the cover therefor securely locked in covering position.

Since each of the flower shaped members is removable from the general assembly for individual use, it is another object to provide means associated therewith which means is utilitarian and decorative both, to give a sure grip on the flower shaped member. Such means are in the nature of simulated leaves extending from the stems of the flower shaped members.

Finally, it is an object to make it possible to carry out all of the foregoing objects in an inexpensive manner well adapted to mass production, by using plastic as the material therefor, which may be readily molded.

How these and many other objects are to be implemented will become clear through a consideration of the accompanying drawings, wherein;

Fig. 1 shows an elevation of the inventive assembly partly in section;

Fig. 2 is a top view of the blossom portions of one of the flower shaped members, showing the removable cover for the compartment therein in position for removal;

Fig. 3 is a view similar to Fig. 2 with the cover in locked position; and

Fig. 4 is a section at 4—4 of Fig. 3.

The assembly comprises a base member 10 in the shape of a flower pot, a cover for the base member having sockets 12 and 13 therein, and flower shaped members 14 and 15 removably inserted into the sockets. As seen in Fig. 1, a commodity 16 such as sugar may be carried within the base member 10. Each flower shaped member is comprised of a blossom portion 17 and a stem portion 18 from the latter of which extend leaves 19.

Each of the blossom portions is hollow to form a cavity 22 which is open at the top, and extending about the opening is a ledge 23. Cover 24 having apertures 25 therein is of such configuration to appear when in place to be a part of the blossom portions. The cover 24 has a pair of lugs 26 each having a foot 27 as a part thereof, which is designed to be releasably engageable with ledge 23.

In order to make possible release and engagement of lugged cover 24 with ledge 23, the ledge is fashioned with a unique configuration. Ledge 23 has support portions 30, cut back portions 31, and locking portions 32 each of which locking portions extends between and increases in width and thickness from the cut back portion 31 to the support portion 30.

To engage the cover with the ledge about the opening to the cavity lugs 26 are introduced through cut back portions 31 of the ledge. In such position support portions 30 of the ledge will maintain the cover above the opening. By then rotating the cover in the direction of the arrows shown in Fig. 2 the foot of each lug will pass under the locking portions of the ledge, and since the locking portions increase in thickness the feet will become wedged and therefore locked with respect to the ledge. Besides the wedging effect on the foot of each lug, there will be a supplementary wedging effect as the outside of each lug is wedged against the locking portion of the ledge on account of the increasing width of the locking portion of the ledge in the direction of locking twist.

While I have described a specific embodiment of my invention it is apparent that changes and modifications may be made therein without departing from the spirit of my invention.

I claim:

1. A condiment container comprising a hollow base member, a cover for said base member having a socket therein, and a flower shaped member having a stem and a blossom, said stem being in removable engagement with said socket, said blossom having an open cavity for a condiment, an apertured cover for said cavity, and means whereby said apertured cover may be releasably locked in position above said cavity.

2. A condiment container as claimed in claim 1 wherein said flower shaped member is made of plastic.

3. A condiment container as claimed in claim 1 wherein said cover for said hollow base member is removably mountable thereon.

4. A condiment container as claimed in claim 1 wherein said apertured cover has extending therefrom a lug having a foot thereon and a bottom surface, and said blossom has a ledge above said cavity, said ledge having a support portion for supporting said bottom surface, a cut back portion for admission of said foot of said lug therethrough, and a locking portion extending between and increasing in width and thickness from said cut back portion to said support portion, whereby said apertured cover can be rotated from a release position in which said lug passes through said cut back portion of said ledge to a locked position in which the foot and a side of said lug are in contact with said locking portion of said ledge.

5. A condiment container as claimed in claim 4 wherein said apertured cover and said lug extending therefrom are of resilient material whereby said lug may be brought into tight resilient contact with said locking portion of said ledge.

6. A condiment container as claimed in claim 1 wherein said hollow base member is in shape substantially an inverted truncated cone in simulation of a flower pot.

7. A condiment container as claimed in claim 1 wherein said apertured cover has extending therefrom a plurality of lugs each having a foot thereon, and a bottom surface and said blossom has a ledge above said cavity, said ledge having a plurality of support portions for supporting said bottom surface, a plurality of cut back portions for admission of the foot of each of said lugs therethrough, and a plurality of locking portions, each of said locking portions extending between and increasing in width and thickness from one of said cut back portions to one of said support portions, whereby said apertured cover can be rotated from a release position in which said lugs pass through said cut back portions of said ledge to a locked position in which the foot and a side of each said lug is in contact with one of said locking portions of said ledge.

8. A condiment container as claimed in claim 1 including a leaf on said stem whereby said flower shaped member may be easily gripped.

References Cited in the file of this patent
UNITED STATES PATENTS

| | | |
|---|---|---|
| 2,418,952 | Poillon | Apr. 15, 1947 |
| 2,513,625 | Cole | July 4, 1950 |